(12) United States Patent
Stout

(10) Patent No.: US 9,695,973 B2
(45) Date of Patent: Jul. 4, 2017

(54) ATTACHMENT MECHANISM

(71) Applicant: Dowco, Inc., Manitowoc, WI (US)

(72) Inventor: Kenneth Lauerance Stout, Sheboygan Falls, WI (US)

(73) Assignee: Dowco, Inc., Manitowoc, WI (US)

( * ) Notice: Subject to any disclaimer, the term of this patent is extended or adjusted under 35 U.S.C. 154(b) by 0 days.

(21) Appl. No.: 14/608,557

(22) Filed: Jan. 29, 2015

(65) Prior Publication Data

US 2015/0211679 A1    Jul. 30, 2015

Related U.S. Application Data

(60) Provisional application No. 61/933,189, filed on Jan. 29, 2014.

(51) Int. Cl.
| | |
|---|---|
| *A47G 29/00* | (2006.01) |
| *F16M 13/02* | (2006.01) |
| *B60R 11/00* | (2006.01) |
| *F16M 11/04* | (2006.01) |
| *B62J 9/00* | (2006.01) |
| *F16B 5/06* | (2006.01) |
| *F16B 21/07* | (2006.01) |

(52) U.S. Cl.
CPC .......... *F16M 13/022* (2013.01); *B60R 11/00* (2013.01); *B62J 9/001* (2013.01); *F16M 11/041* (2013.01); *B60R 2011/0059* (2013.01); *F16B 5/0685* (2013.01); *F16B 21/07* (2013.01)

(58) Field of Classification Search
CPC . F16B 2/12; F16B 2/14; F16L 13/1025; B62J 9/00; B62J 9/001; B62J 7/00; B62J 7/04

USPC .......... 224/448, 419–427; 248/230.4, 316.8, 248/316.4, 316.2, 316.1, 222.11, 412, 248/74.5, 74.4, 74.2, 230.1, 230.3, 230.7; 211/60.1
See application file for complete search history.

(56) References Cited

U.S. PATENT DOCUMENTS

| | | | | |
|---|---|---|---|---|
| 5,024,359 | A * | 6/1991 | Thomas | B62J 7/06 224/414 |
| 8,028,877 | B2 * | 10/2011 | Lien | B62J 9/001 224/417 |
| 2008/0041901 | A1 * | 2/2008 | Chuang | B62J 9/001 224/430 |
| 2008/0073396 | A1 * | 3/2008 | Chiang | B62J 9/001 224/413 |

(Continued)

OTHER PUBLICATIONS

Website screenshot; http://www.twistedthrottle.com/quick-release-mounting-kit-for-2-cases-sidecase-setup; captured Mar. 5, 2015; (prior art for purposes of prosecution).

(Continued)

*Primary Examiner* — Christopher E Garft
(74) *Attorney, Agent, or Firm* — Shane Delsman; Godfrey & Kahn, S.C.

(57) ABSTRACT

An attachment mechanism is used to quickly and easily attach or detach an accessory or piece of equipment to or from an existing structure. The attachment mechanism generally has a slot to receive a structure, a retention member to hold the structure in place when it is desired to have the mechanism attached to the structure and a release mechanism to release the structure when it is desired to release the mechanism from the structure.

19 Claims, 18 Drawing Sheets

(56) References Cited

U.S. PATENT DOCUMENTS

| | | | | |
|---|---|---|---|---|
| 2009/0308903 A1* | 12/2009 | Vigeant | ...................... | B62J 7/08 |
| | | | | 224/431 |
| 2010/0012416 A1* | 1/2010 | Chan | .......................... | B62J 7/04 |
| | | | | 180/219 |
| 2013/0043289 A1* | 2/2013 | Visenzi | .................... | B62J 9/001 |
| | | | | 224/449 |

OTHER PUBLICATIONS

Website screenshot; https://web.archive.org/web/20130312182510/http://www.touratech-usa.com/Store/1806/PN-053-0020/Pannier-Mounting-Kit-18mm; Mar. 12, 2013.

Website screenshot; http://www.touratech-usa.com/media/ixodSK/pannier_instr.pdf; Apr. 8, 2010.

Website screenshot; https://www.youtube.com/watch?v=XzkmPMANR30; Nov. 1, 2008.

SW-Motech Bags—Connection engineering for motorbikes catalog; 2013.

\* cited by examiner

ATTACHMENT MECHANISM

CROSS REFERENCE TO RELATED APPLICATION

This application claims the benefit of U.S. Provisional Patent Application Ser. No. 61/933,189, filed Jan. 29, 2014, the disclosure of which is hereby incorporated by reference herein in its entirety for all purposes.

FIELD OF THE INVENTION

The present invention relates generally to the field of powersports and marine accessories. More particularly, the present invention relates to devices for mounting accessories onto a vehicle.

BACKGROUND

It is common to bring accessories and/or equipment, such as luggage, coolers, audio equipment, fishing poles, etc. when participating in powersport or marine activities. One problem is that there is either little room for such accessories and/or equipment, for example on motorcycles, all terrain vehicles (aka "ATVs") and utility task vehicles (aka "UTVs"), or if not secured, the accessories and/or equipment are tossed around creating a disorganized mess and/or a safety issue, for example on a boat. Therefore, such accessories and/or equipment must either be mounted to a vehicle or otherwise secured in place.

One method used to attach such accessories and/or equipment is to strap the equipment to a vehicle. However, such straps can be time consuming and inconvenient to install. If straps become loose during use of the vehicle, the straps can become tangled in moving components of the vehicle damaging the straps and/or components and creating a safety hazard. Further, when not in use or loose, the straps can be unsightly.

Another method used to attach such accessories and/or equipment is to install a mounting plate onto a vehicle that mates with a corresponding part that is attached to the accessory and/or equipment. Although mounting plates and the corresponding parts eliminate some of the problem caused by straps, the mounting plates must be installed on the vehicle, in most cases permanently. Such installation causes permanent damage to the vehicle, for example drilling holes, and can be complicated to install and unattractive.

As such, there is a need for a device that can be quickly and easily attached to and removed from parts of a vehicle that already exist, such as a frame member or rack.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

SUMMARY OF THE INVENTION

In one embodiment, the invention provides an attachment mechanism for quickly and easily attaching to and detaching from a structure. The attachment mechanism has a housing with a slot, a movable retention member and a means for biasing the retention member at least partially in the slot. The attachment mechanism also has a release mechanism that is connected to the retention member such that when the release mechanism is engaged the retention member is substantially removed from the slot.

In another embodiment, the invention provides an accessory with an attachment feature attached to the accessory. The attachment feature has a housing, an opening in the housing for receiving a structure and a releasable retention means for selectively retaining the structure in the opening.

In another embodiment, the invention provides an attachment member having a housing, a slot in the housing and a retention member having a first end and second end. The first end of the retention member retractably extends into the slot. A release mechanism is connected to the second end of the retention member. A spring is connected to the release mechanism and retention member to force the first end of the retention member into the slot. When the release mechanism is not engaged, the first end of the retention member extends into the slot and when the release mechanism is engaged, the first end of the retention member is at least partially retracted from the slot.

In one embodiment, the invention provides an attachment mechanism for quickly and easily attaching to and detaching from a structure. The attachment mechanism has a housing with a slot, a movable retention member and a spring for biasing the retention member at least partially in the slot. The attachment mechanism also has a release mechanism that is connected to the retention member such that when the release mechanism is engaged the retention member is operably removed from the slot.

DETAILED DESCRIPTION

Figure 1:
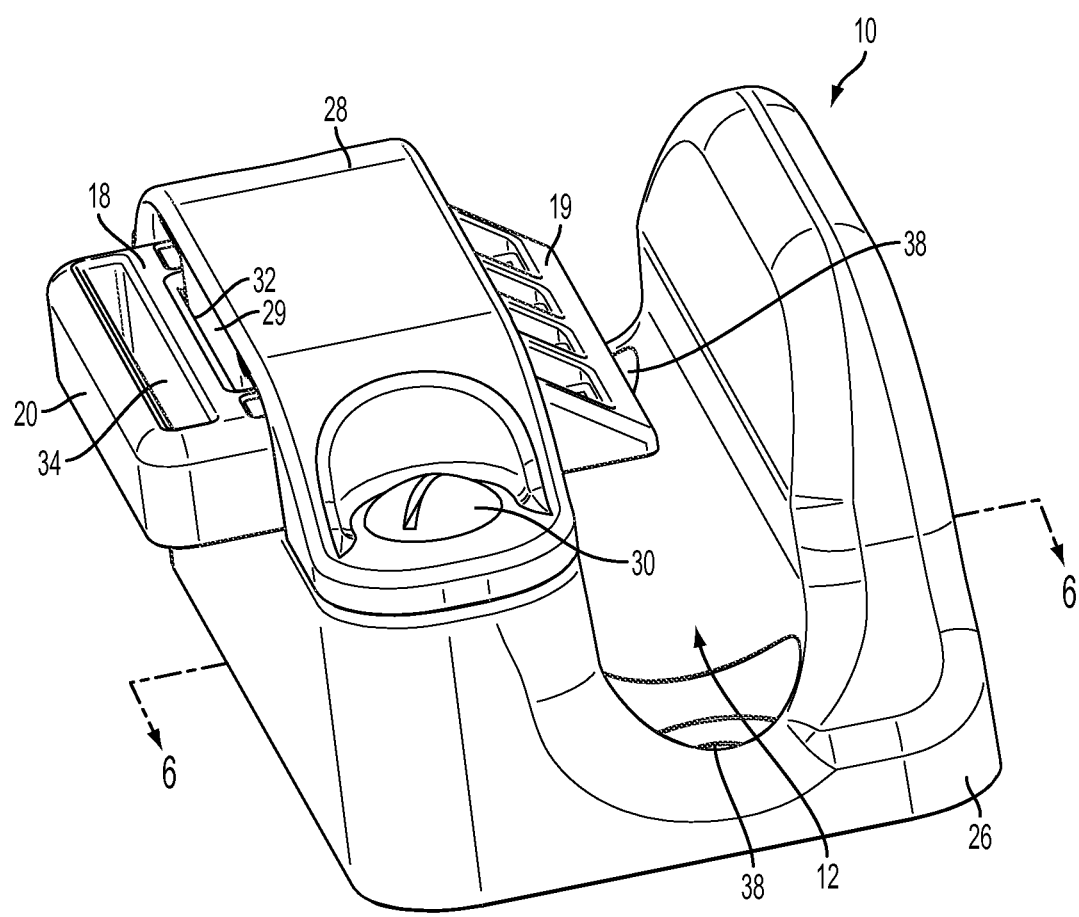
FIG. 1 is a perspective view of one embodiment of an attachment mechanism in accordance with the invention.
Figure 2:
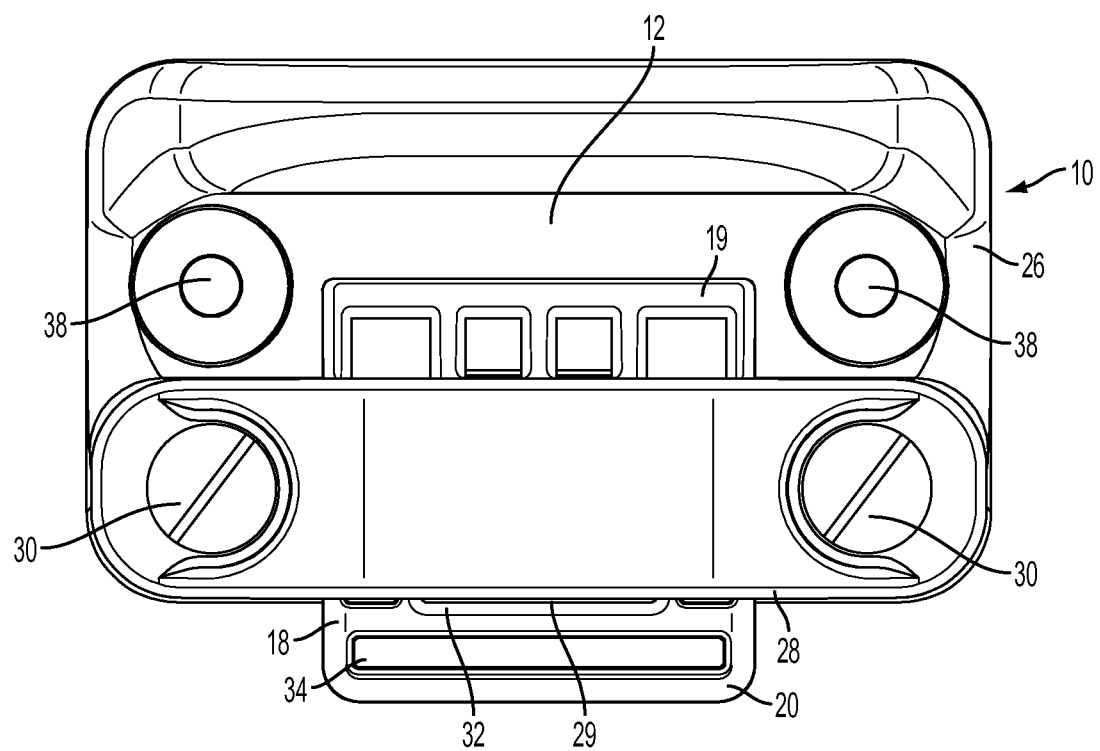
FIG. 2 is a top plan view of the attachment mechanism in FIG. 1.
Figure 3:
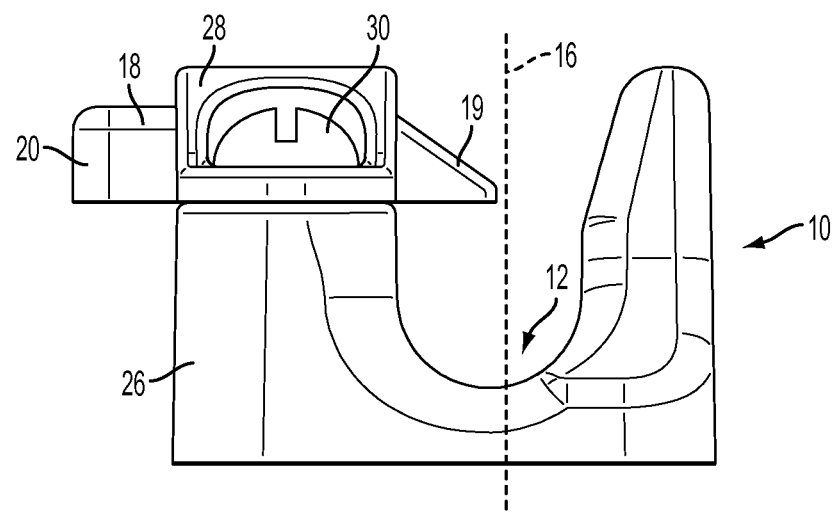
FIG. 3 is a side elevation view of the attachment mechanism in FIG. 1.
Figure 4:
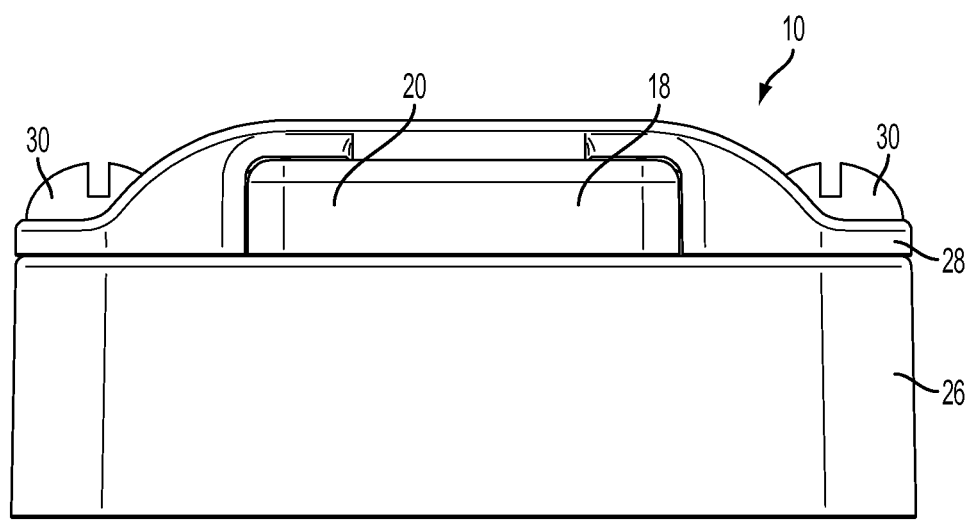
FIG. 4 is a rear elevation view of the attachment mechanism in FIG. 1.
Figure 5:
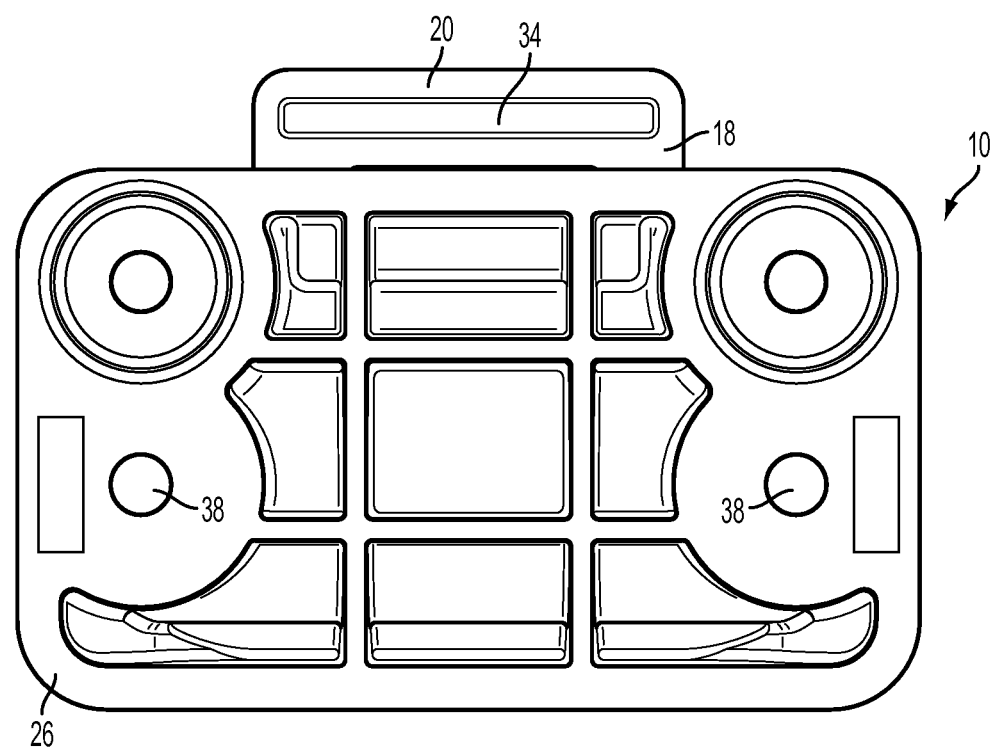
FIG. 5 is a bottom plan view of the attachment mechanism in FIG. 1.
Figure 6:
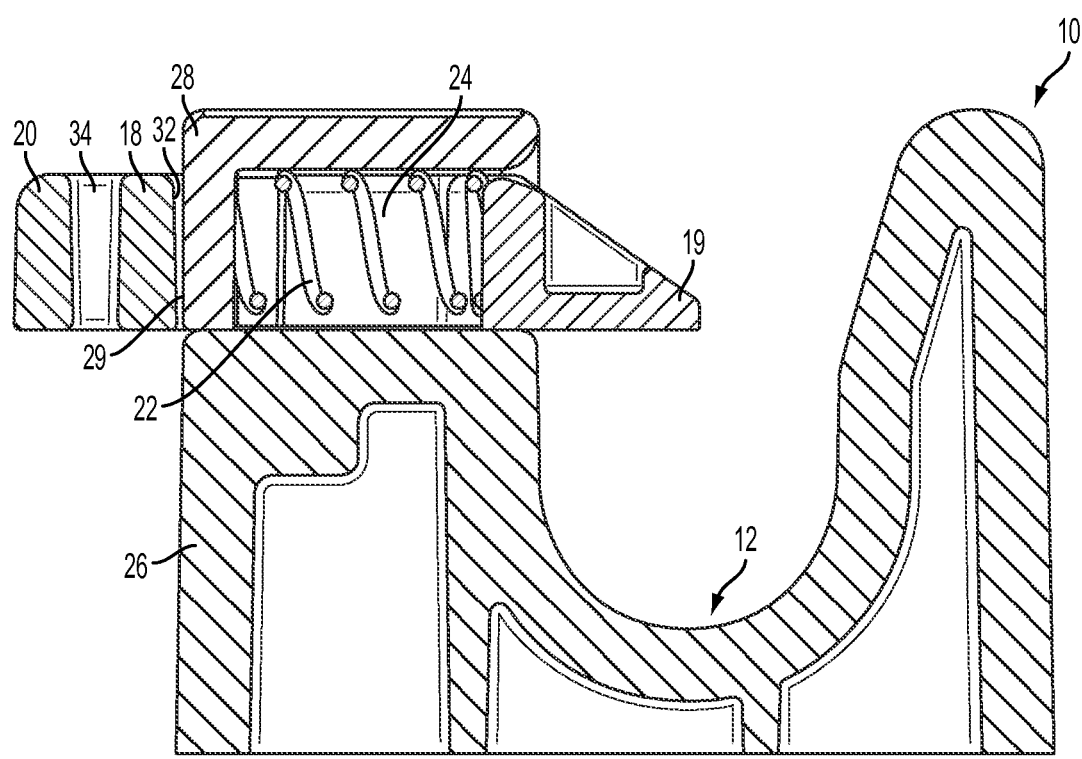
FIG. 6 is a cross-section elevation view of the attachment mechanism in FIG. 1 taken along the line 6-6 in FIG. 1.
Figure 7:
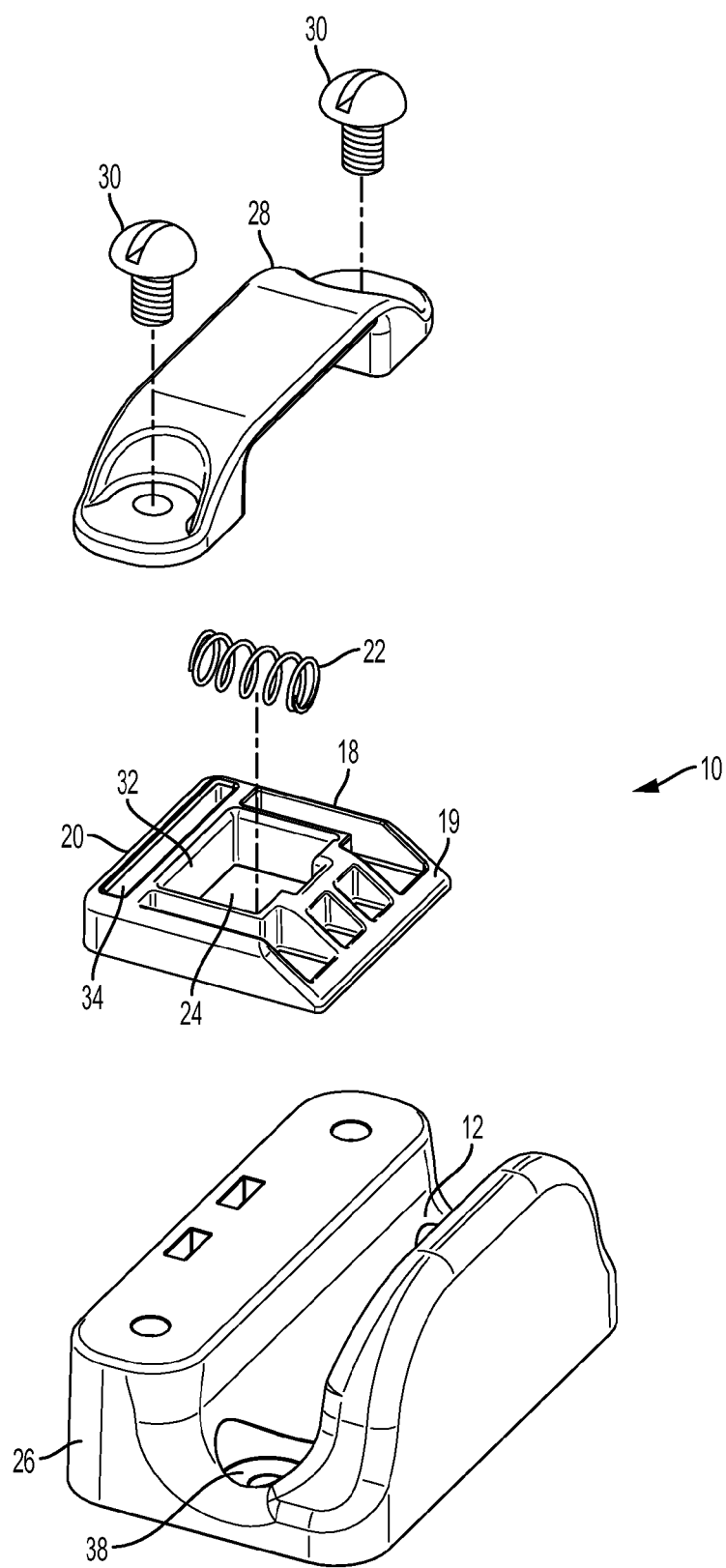
FIG. 7 is an exploded perspective view of the attachment mechanism in FIG. 1.

An attachment mechanism or member 10 in accordance with the present invention is for easily and quickly attaching/detaching an accessory or piece of equipment to/from a variety of structures. The attachment mechanism 10 is also easy to mount onto or incorporate in an accessory or piece of equipment.

As seen in FIGS. 1-7, the attachment mechanism 10 generally includes a an opening or slot 12 sized and shaped for receiving a structure 14, for example a rack, and a releasable retention means for selectively holding the structure in the slot. Although the slot 12 shown has a generally cylindrical shape for receiving a cylindrical bar or tube from a rack, the shape and size of the slot could be changed to accommodate a single or variety of shapes and sizes of structure 14 to which it is desired to be mounted.

The elongation or length of the slot 12 helps constrain the motion of the attachment mechanism 10, and thereby, the accessory, by reducing twisting or torqueing about an axis 16 perpendicular to the structure 14. The elongation or length of the slot 12 can also be of a desired length to accommodate a particular configuration of a structure 14.

Figure 8:
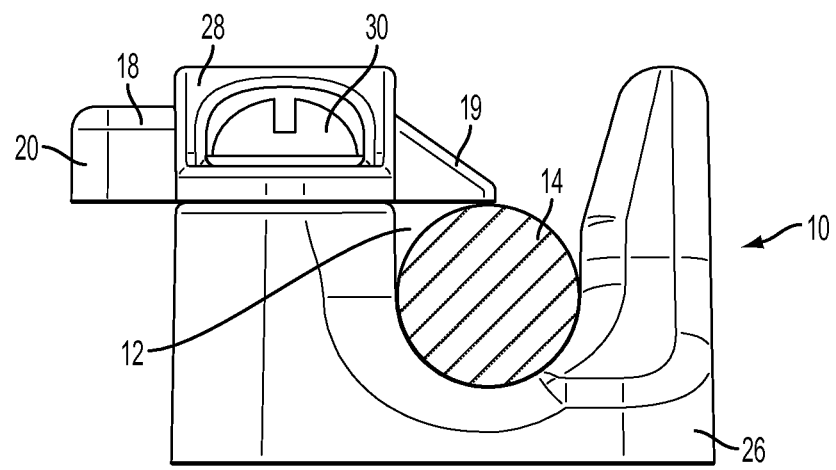
FIG. 8 is a side elevation view of an attachment mechanism mounted to a structure, the structure shown in cross-section.
Figure 9:
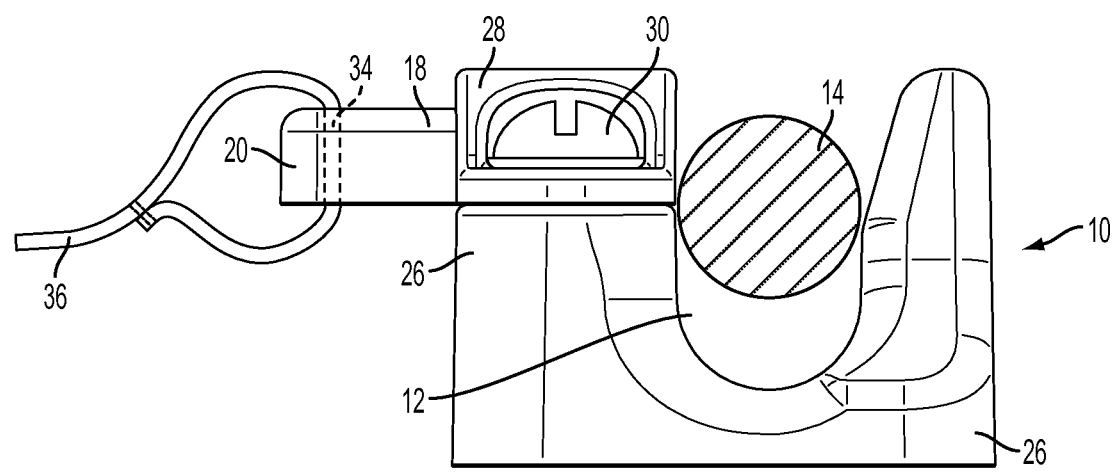
FIG. 9 is a side elevation view of the attachment mechanism of FIG. 8 shown with the structure being removed, the structure shown in cross-section.

The releasable retention means of the attachment mechanism 10 seen in FIGS. 1-7 includes a retention member 18. On one end of the retention member shown in FIGS. 1-7 is a movable protruding member or protrusion 19 and on the other end is a disengagement or release mechanism 20. As seen in FIG. 8, when the release mechanism 20 is not engaged, the protrusion 19 extends into the slot 12 to prevent a structure 14 residing in the slot from being withdrawn. As seen in FIG. 9, when the release mechanism 20 is engaged, the protrusion 19 is at least partially withdrawn from the slot 12 to allow a structure 14 residing in the slot to be withdrawn. Alternatively, the retention member 18, protrusion 19 and/or release mechanism 20 could be separate parts that cooperate to perform as described.

The illustrated attachment mechanism 10 can also include a biasing means, or means for biasing, to urge the retention member 18 into the slot. The biasing means seen in FIG. 6 includes a spring 22 that resides in a compartment 24 of the attachment mechanism. The spring 22 could be made from metal or plastic and could be molded into the housing 26 or housing cap 28 and a retention member 18 later attached. The means for biasing could also include other resilient members or dampers known in the industry, for example a compressible elastic material, the use of which would not defeat the spirit of the invention.

The compartment 24 is formed on the bottom by the housing 26 of the attachment mechanism 10 and the top and three sides by the housing cap 28. The remaining side of the compartment 24 is formed by the retention member 18. One end of the spring 22 shown in FIG. 6 abuts a wall 29 of the housing cap 28 and the second end of the spring abuts the retention member 18. When no external force is acting on the spring 22, the spring expands to enlarge the compartment 24. Because the wall 29 is part of the housing cap 28, which is secured to the housing 26 as discussed below, when the spring expands, the spring pushes or forces the protrusion 19 of the movable retention member 18 into the slot 12.

The housing cap 28 is shown attached to the housing 26 by fasteners 30 and thereby provides a means for accessing the compartment. However, other means of attaching two components together are known in the industry, for example, rivets, snaps, welds, glues, etc., the use of which would not defeat the spirit of the invention.

The compartment 24 and/or the housing cap 28 could be integrally formed with the housing 26. For example, the housing 26 could include a cavity that extends from the bottom up to the location of retention member 18 and a biasing means placed in the housing through the cavity. The biasing means could also be located outside of the housing 26 and/or housing cap 28. However, having the biasing means in an easily accessible compartment 24 protects the biasing means from exterior elements and damage, while allowing the biasing means to be accessed if adjustment or replacement is necessary. The easily accessible compartment 24 could also allow access to the retention member 18 and/or other internal components of the attachment mechanism 10.

As seen most clearly in FIG. 8, when the retention member 18 of the attachment mechanism 10 contacts a structure 14, in the example shown a tube, and an external force is applied sufficient to overcome the force of the spring 22, for example the attachment mechanism contacts the structure, the external force will cause the retention member to retract out of the slot 12.

Although the protrusion 19 is shown as a ramp in the embodiment shown in FIGS. 1-7, the protrusion could be of any desired shape that cooperates with a structure 14 to withdraw the protrusion from the slot 12. For example, the protrusion 19 could have a rectangular shape such that a round structure, when entering the slot 12, contacts the edge of the rectangular protrusion to urge the protrusion out of the slot. Further, the protrusion 19 does not need to be completely withdrawn from the slot 12. For example, if the slot 12 is larger than the structure 14, the protrusion 19 need only be withdrawn from the slot such that the structure can get past the protrusion and be seated in the slot. The protrusion 19 could alternatively be hinged such that the protrusion is rotated down and out of the way of the slot 12.

As previously discussed, the retention member 18 can move or slide within the housing cap 28. The retention member 18 of the attachment mechanism 10 shown in FIG. 6 includes a stop surface 32. When the stop surface 32 contacts the wall 29 of the housing cap 28, the wall prevents the retention member 18 from sliding any further towards the slot 12 and thereby prevents the spring 22 from pushing the retention member out of the housing cap.

The release mechanism 20 shown in FIGS. 1-7, includes an opening 34. The opening 34 could be used could be used to hold a small band 36 as seen in FIG. 9. However, the opening 34 could also be sized to allow one or more fingers to be placed therein to easily pull the release mechanism 20 and, thereby the retention member 18 and protrusion 19, to release a structure 14 from the attachment mechanism 10. Alternatively, the release mechanism 20 could form a tab, handle or another desired configuration known in the art that allows a user to easily grasp the release mechanism and operate the retention member 18. The release mechanism 20 could also comprise a button or trigger that when pushed withdraws the protrusion 19 from the slot 12, such as by inhibiting or overcoming the biasing means.

Figure 11:
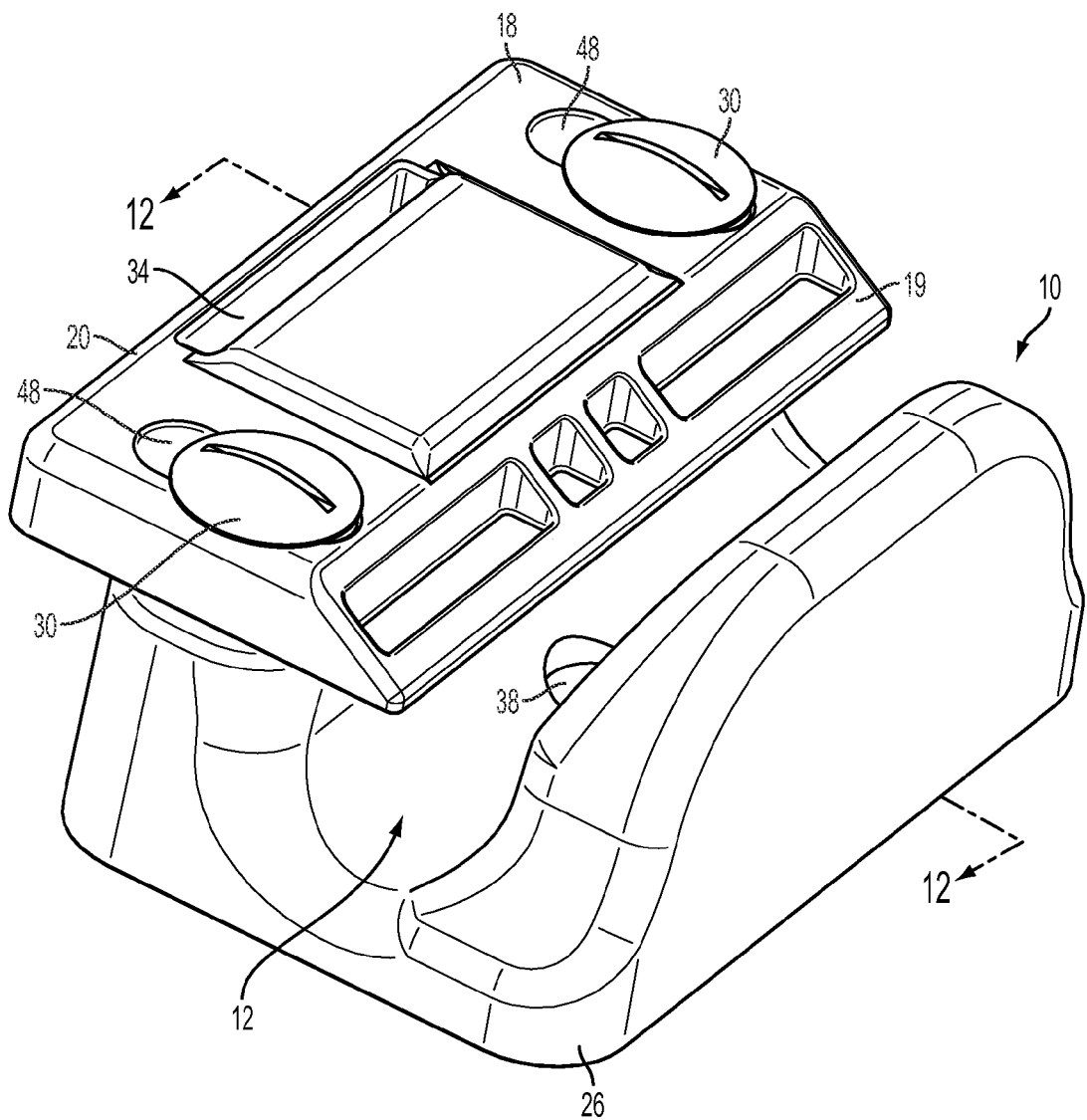
FIG. 11 is a perspective view of an alternative embodiment of an attachment mechanism in accordance with the invention.
Figure 12:
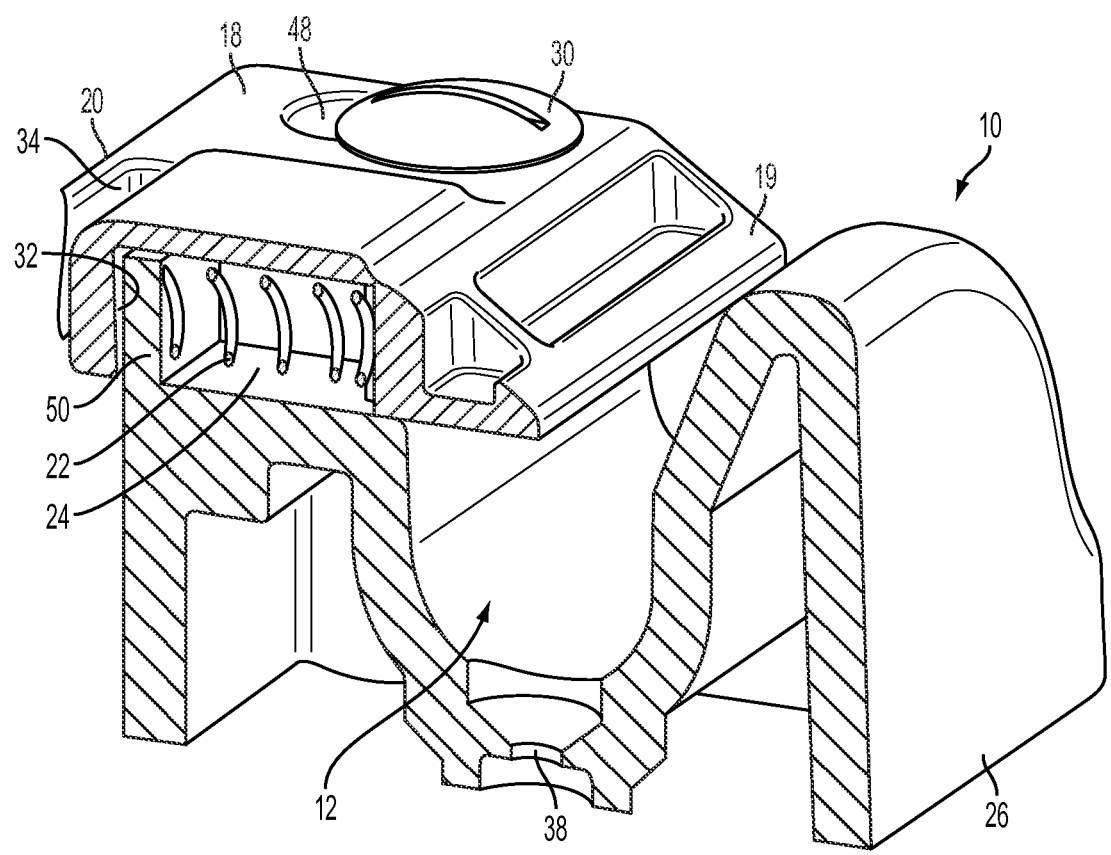
FIG. 12 is a cross-section perspective view of the attachment mechanism in FIG. 11 taken along the line 12-12 in FIG. 11.

In an alternative embodiment shown in FIGS. 11-12, the attachment mechanism 10 includes a retention member 18 that is connected to the housing 26 by fasteners 30 through elongated apertures 48. The fasteners 30 are not completely tightened so as to allow the retention member 18 to slide as the position of the fasteners 30 change within the elongated apertures 48.

The biasing means, in the embodiment shown in FIGS. 11-12 a spring 22, is located in a compartment 24 that is enclosed at its top by the retention member 18. One end of the spring 22 shown in FIG. 12 abuts a wall 50 of the housing 26 and the second end of the spring abuts the retention member 18. When no external force is acting on the spring 22, the spring expands to enlarge the compartment 24. Because the wall 50 is part of the housing 26, when the spring 22 expands, the spring pushes or forces the protrusion 19 of the movable retention member 18 into the slot 12.

The retention member 18 of the attachment mechanism 10 shown in FIGS. 11-12 includes a stop surface 32. When the stop surface 32 contacts the wall 50 of the housing 26, the wall prevents the retention member 18 from sliding any further towards the slot 12 and thereby keeps the retention member in the correct orientation within the slot 12.

The components of the attachment mechanism 10, for example, the retention member 18, the housing 26 and/or the housing cap 28, can be produced through injection molding, metal casting, or machining. For example, the retention member 18, the housing 26 and/or the housing cap 28 can be made from plastic or metal depending on the loading to which they will likely be subjected. The retention member 18, the housing 26 and/or the housing cap 28 could also have additional features in order to constrain the motion of the attachment mechanism 10 in all directions, such as features compatible or mating with those in the structure 14 to which the attachment mechanism is being attached.

The retention member 18, the housing 26 and/or the housing cap 28, or portions thereof, may also use a soft or protective material, for example, rubber or felt to be over-molded, adhered, or attached in order to eliminate any scratching or abrasion of the structure 14 to which the attachment mechanism 10 is attached, e.g. motorcycle.

The attachment mechanism 10 can also include mounting structure(s) to allow the attachment mechanism to be mounted to an accessory or piece of equipment. In the embodiment shown in FIGS. 1-2, 5, 7 and 11-12, the mounting structure includes holes 38 at the bottom of the slot 12. Thereby, the attachment mechanism 10 can be attached to an accessory or piece of equipment with permanent or releasable mechanical fasteners such as screws, rivets, snaps or other such means known in the art. The use of releasable fasteners such as screws, allows the attachment mechanism 10 to be easily mounted and removed from an accessory or piece of equipment. Alternatively, the attachment mechanism 10 or component of the attachment mechanism, such as the housing 26, could be a molded feature in or of the accessory. Although above are described a few examples of means for mounting the attachment mechanism 10 to an accessory or piece of equipment, other means are known in the art, for example welding, the use of which would not defeat the spirit of the invention.

Figure 13:
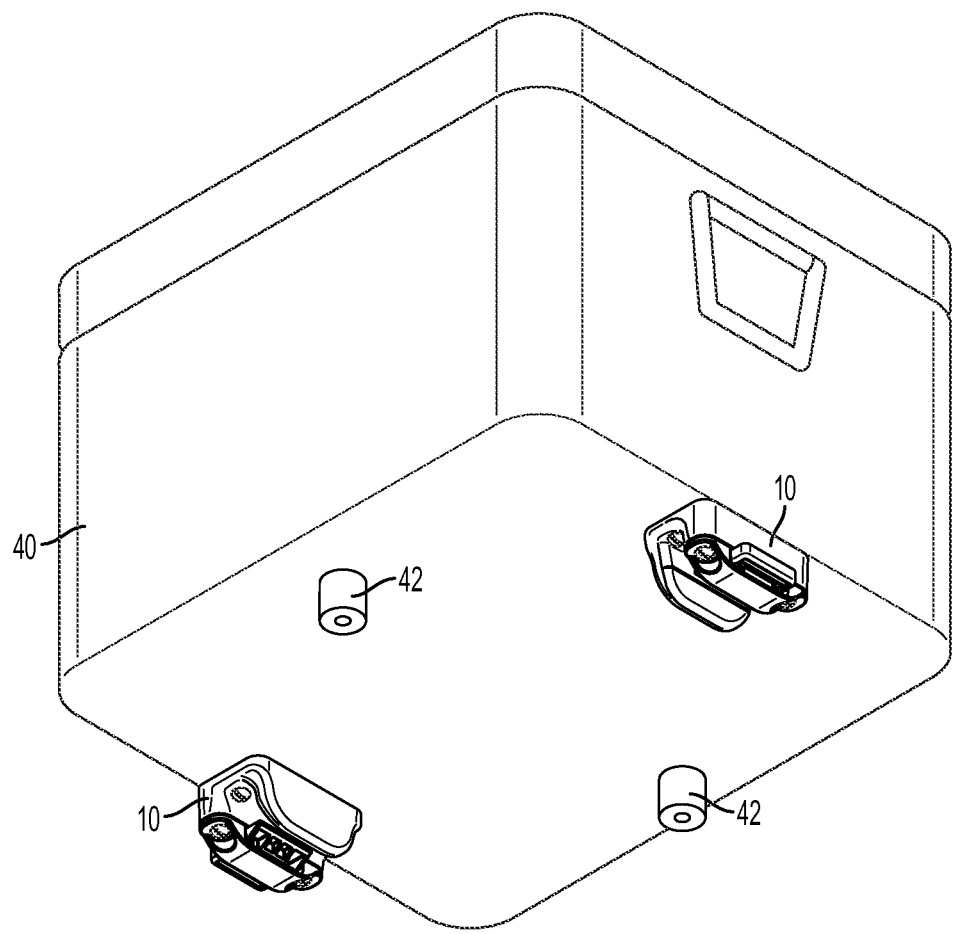
FIG. 13 is a bottom perspective view of an accessory with two attachment mechanisms connected thereto.
Figure 14:
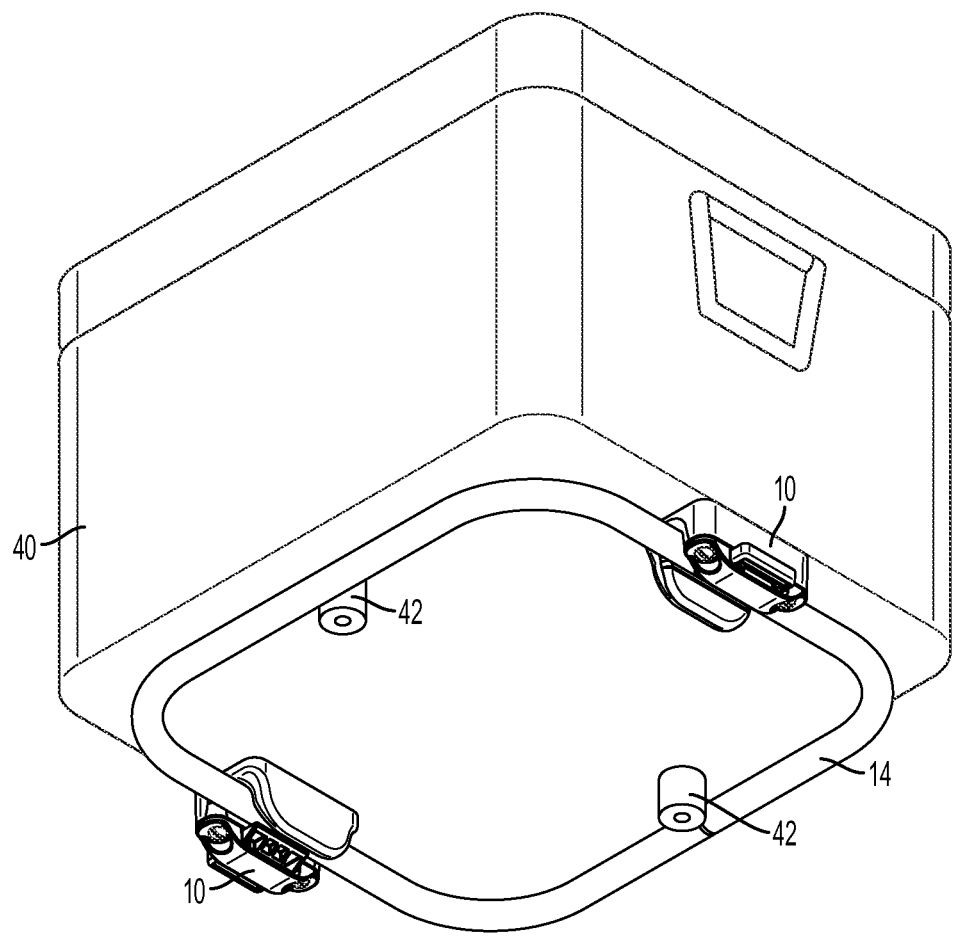
FIG. 14 is a bottom perspective view of the accessory of FIG. 13 attached to a rack.

As seen in FIG. 13, two attachment mechanisms 10 are mounted to a cooler 40. In the configuration seen in FIG. 14, the attachment mechanisms 10 are mounted parallel to one another. As seen in FIG. 14, the cooler 40 is mounted to a rack structure 14 as may be found, for example, on an ATV or UTV. As previously discussed, the elongation of the slot 12 helps reduce twisting or torqueing about an axis 16 perpendicular to structure 14. Using two attachment mechanisms 10, in parallel, further constrains rotation about the axis 16 and the structure 14. In order to reduce any movement of the attachment mechanism 10 along the length of the structure 14, such as sliding, bumpers 42 can also be mounted to the cooler 40. The bumpers could also be sized such that they also provide support to the cooler 40 by contacting the surface of the vehicle to which the structure 14 is attached. The soft or protective material can also assist in prohibiting sliding if the material has sufficient frictional characteristics.

The number and configuration of attachment mechanisms 10 mounted to an accessory or piece of equipment is almost limitless and can be selected to cooperate with a specific type or variety of structural configuration(s). For example, in FIG. 15, the structure 14 is of a trapezoidal arrangement. The cooler 40 seen in FIG. 15 has two attachment mechanisms 10 mounted thereto in a configuration that matches the trapezoidal arrangement of the structure 14. Because the attachment mechanisms are connected to non-parallel portions of the structure 14, the attachment mechanisms are constrained from movement along the length of the structure.

Figure 10:
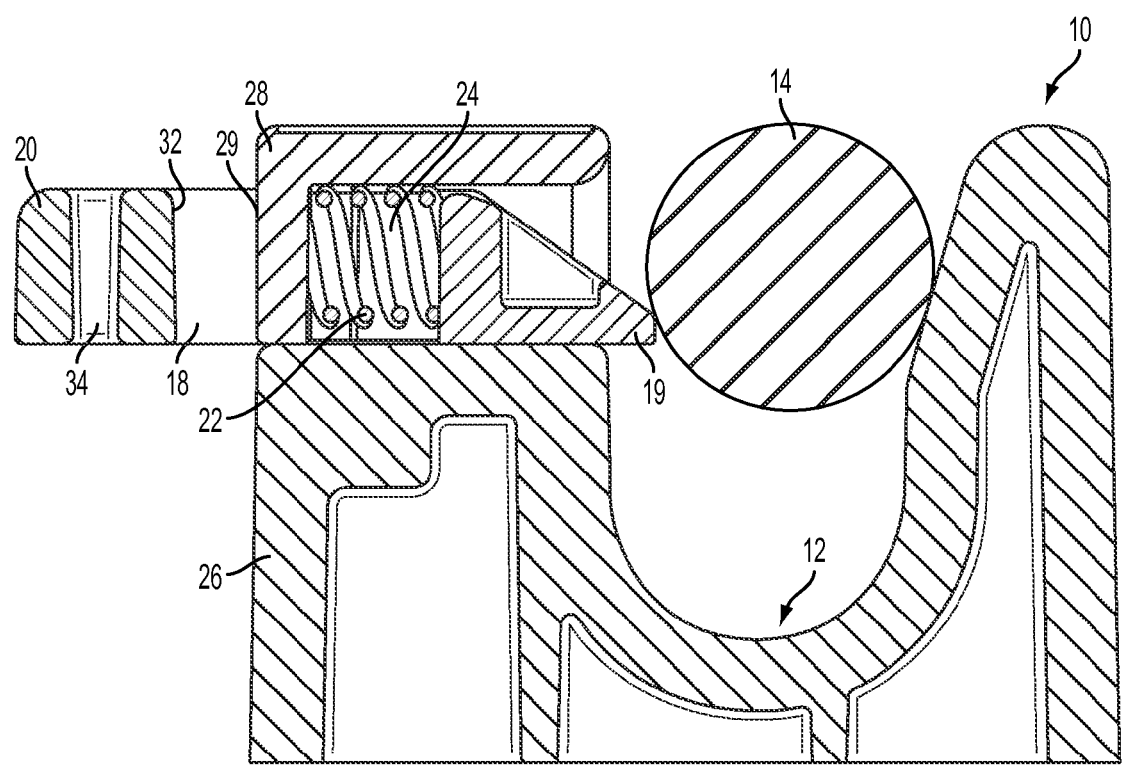
FIG. 10 is a cross-section elevation view of the attachment mechanism of FIG. 8, shown with the structure being inserted.

In order to attach the cooler 40 to the structure 14, one can simply set the cooler on the structure such that the structure lines up with the slots 12 of the attachment mechanisms 10. If the weight of cooler 40 is sufficient to overcome the force of the springs 22, the weight of the cooler, in combination with the contact of the structure 14 with the protrusion 19, will cause the protrusion to withdraw from the slot, as seen in FIG. 10. When the structure 14 is seated in the slot 12, the spring 22 will again urge the protrusion 19 back into the slot, thereby securing the attachment mechanism 10 and cooler 40 to the structure.

Figure 15:
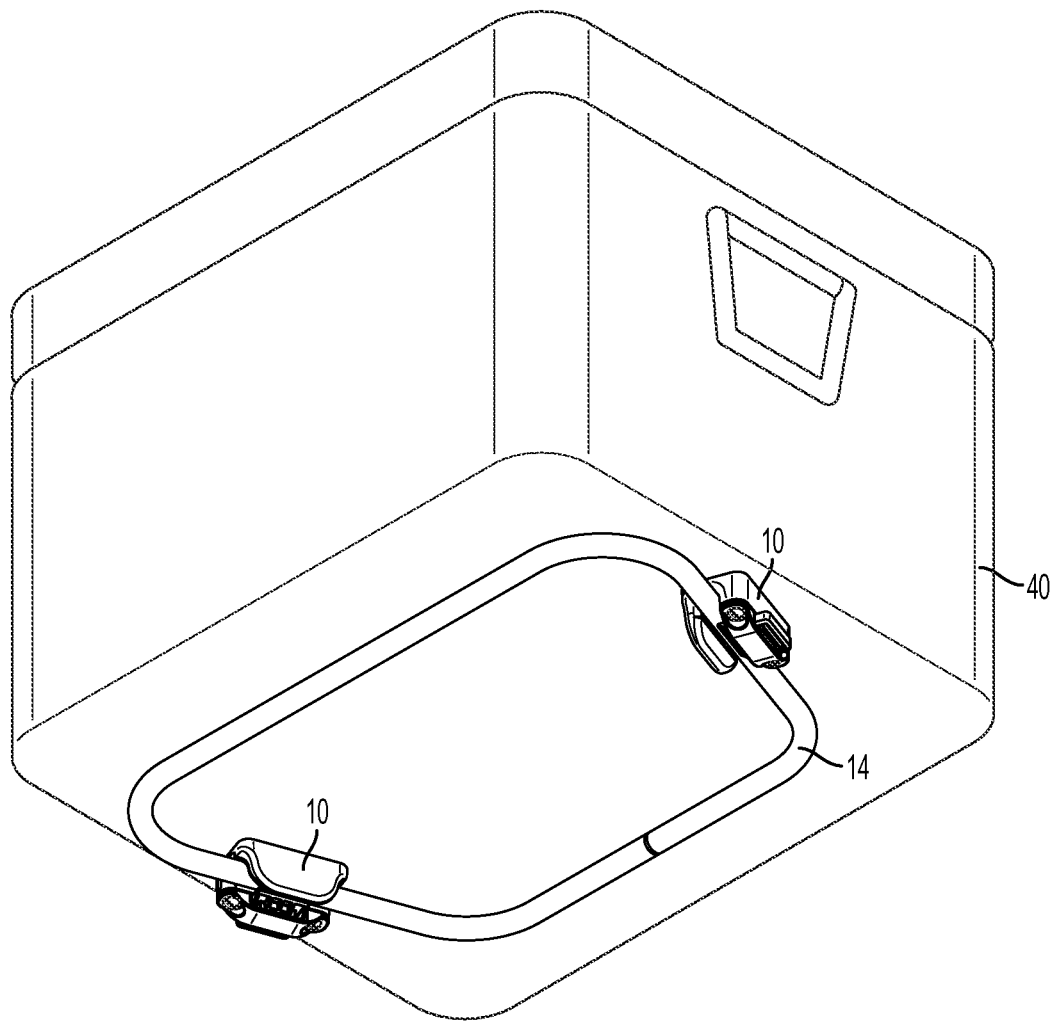
FIG. 15 is a bottom perspective view of another accessory with two attachment mechanisms connected thereto.

In the embodiment shown in FIGS. 13-15, the attachment mechanisms 10 are mounted to the cooler 40 at the perimeter of the cooler such that the release mechanisms 20 are easily accessible. When it is desired to remove the cooler 40 from the structure 14, the user can simply grab one release mechanism 20 in each hand and pull to withdraw the protrusions 19 from the slots 12. With the protrusions 19 withdrawn from the slots 12, the cooler can be lifted from the structure and moved to a desired location.

When removed from the structure, the bumpers 42 of the cooler 40 can cooperate with the attachment mechanisms 10 to create a stable base for the cooler to rest on. More bumpers 42 could be added as desired to increase the stability of the accessory or equipment. The housing cap 28 could also be made from or have attached to it a soft material in order to protect the surface on which the accessory or equipment is placed when not attached to a structure. Alternatively, the attachment mechanism(s) 10 could be incorporated within the bottom or on the exterior perimeter of the accessory or equipment such that the attachment mechanism(s) does not extend from the bottom of the accessory or equipment. In such a configuration, the accessory or equipment would rest on the bottom of its own housing.

Although FIGS. 13-15 show embodiments of attachment mechanisms 10 mounted to an accessory such that the accessory can be attached to a horizontal structure, the attachment mechanisms could also be used to attach an accessory or piece of equipment to a vertical structure such as on the side of a motorcycle.

Figure 16:
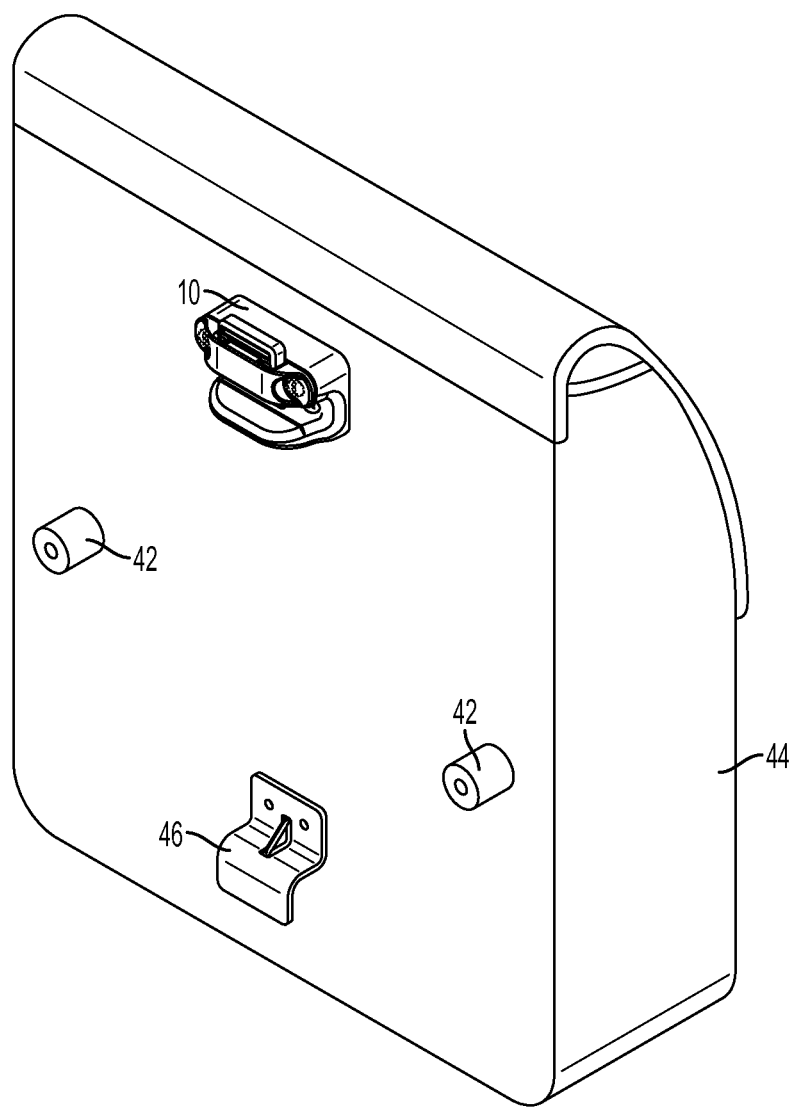
FIG. 16 is a rear perspective view of another accessory with an attachment mechanism and a hanger connected thereto.
Figure 17:
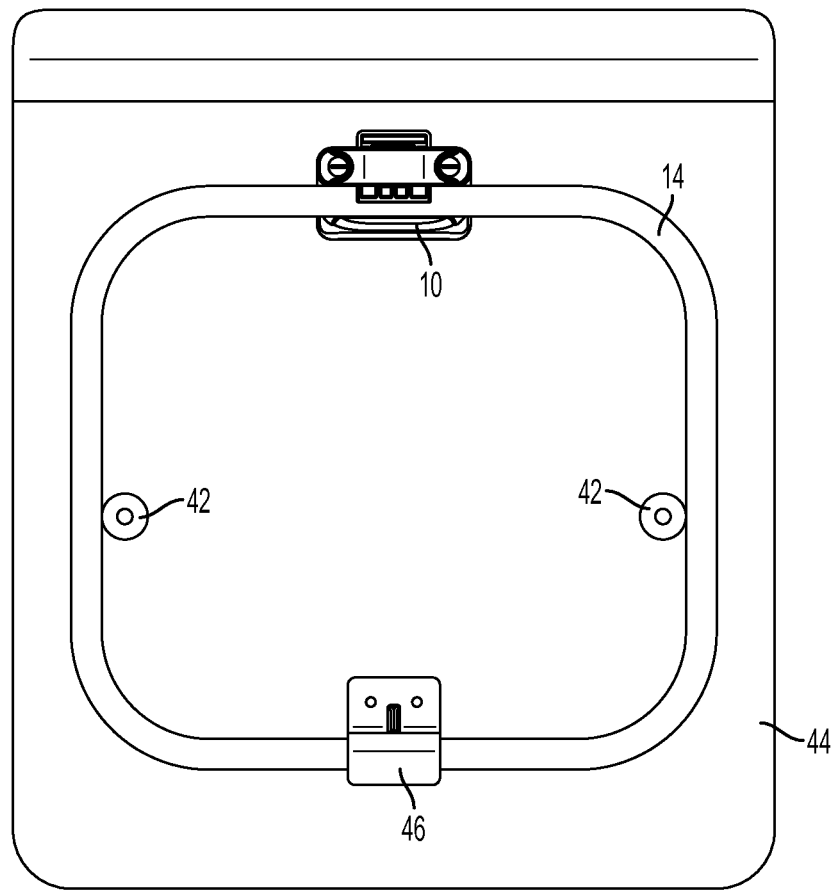
FIG. 17 is a rear elevation view of the accessory of FIG. 16 attached to a rack.

As seen in FIG. 16, a piece of luggage 44 is shown with an attachment mechanism 10 mounted to the top rear side of the luggage. When attached to a vertical structure 14 as seen in FIG. 17, the luggage 44 depends or hangs from the structure. In order to help secure and support the bottom portion of the luggage 44, for example so that the luggage does not rotate up and away from the structure 14, such as if a bump in the road is encountered, the luggage seen in FIGS. 16-17 includes a hook. In order to attach the luggage 44, the hook is slipped behind the bottom portion of the structure 14 and then the top of the luggage can be pushed towards the structure until the attachment mechanism 10 locks into place with the structure. As described above, bumpers 42 can also be mounted to the luggage 44 in order to help constrain movement of the luggage laterally along the structure 14.

Figure 18:
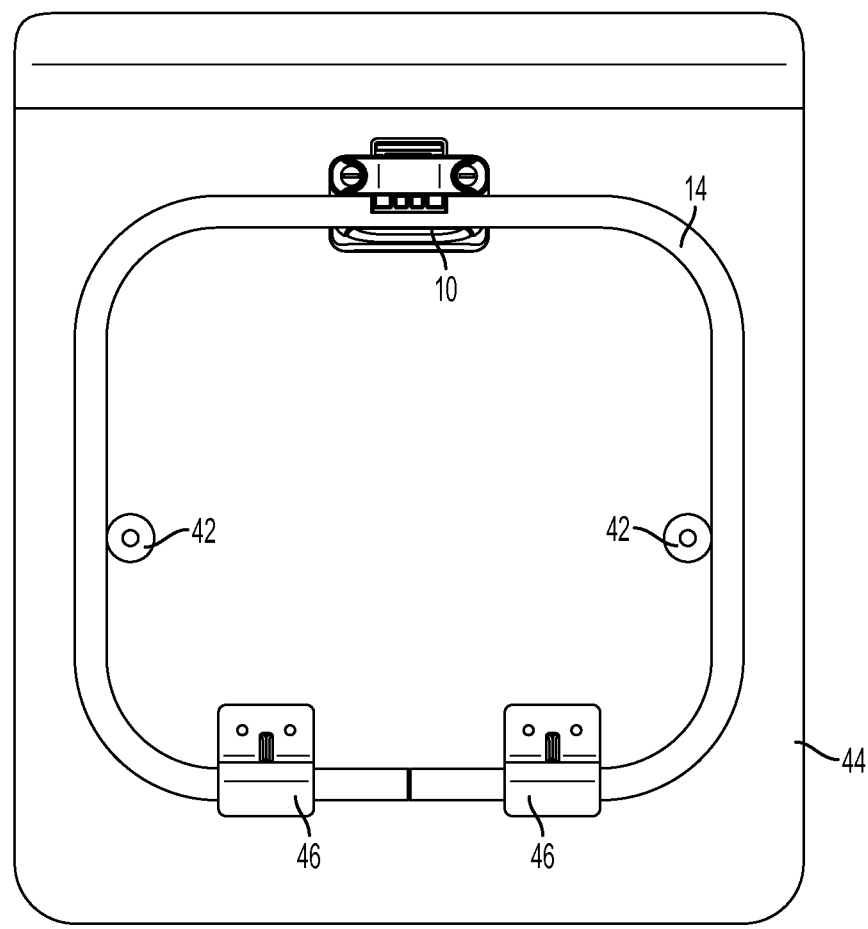
FIG. 18 is a rear perspective view of another accessory with an attachment mechanism and two hangers attached to a rack.

As seen in FIG. 18, a second hook 46 can be added to the luggage 44 to help further constrain rotation about the axis 16 and the structure 14. The second hook does not add any inconvenience or require additional steps to attach the luggage 44 shown in FIG. 18 as compared to the luggage shown in FIGS. 16-17.

Although the embodiments shown in FIGS. 16-18 illustrate a hook or hooks 46 attached to the bottom of the rear side of the luggage 44, a second and third attachment mechanism 10 could also be used. The use of a hook 46 as shown, allows the user to only have to disengage one attachment mechanism, such as by pulling on a band 36 attached to the opening 34 of the release mechanism 20.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. An attachment mechanism comprising:
    a housing with a slot, the slot having opposing walls and sized to receive a structure;
    a movable retention member with a first end;
    a means for biasing the first end of the retention member at least partially in the slot; and
    a release mechanism located exterior from the slot connected to the retention member such that engagement of the release mechanism causes the first end of the retention member to be substantially removed from the slot;
    wherein the means for biasing exerts a force on the retention member to bias the first end of the retention member at least partially in the slot;
    wherein when the first end of the movable retention member is in the slot, the first end extends no further than one of the opposing walls; and
    wherein when the structure contacts the retention member sufficient to exert an external force on the retention member greater than the force exerted by the means for biasing, the first end of the retention member is substantially removed from the slot and the structure can be received in the slot.

2. The attachment mechanism of claim 1 wherein the means for biasing is a spring.

3. The attachment mechanism of claim 1 wherein the housing includes a compartment and the means for biasing is located at least partially within the compartment.

4. The attachment mechanism of claim 3 wherein the compartment includes a means for accessing the compartment and wherein the means for accessing the compartment also provides access to the means for biasing.

5. The attachment mechanism of claim 1 wherein the release mechanism includes a handle.

6. The attachment mechanism of claim 1 wherein the release mechanism includes an opening for attaching a band.

7. An accessory comprising:
    an attachment feature attached to the accessory, the attachment feature further comprising:
        a housing;
        an opening formed by the housing for receiving a structure; and
        a releasable retention means for selectively retaining the structure in the opening, the releasable retention means comprising:
            a slidable protruding member that cooperates with the opening to selectively retain a structure; and
            a disengagement mechanism located remote from the opening and connected to the slidable protruding member;
            wherein when the disengagement mechanism is not activated, the slidable protruding member retains the structure and is spaced from a portion of the housing forming the opening opposite the slidable protruding member, and when the disengagement mechanism is activated, the slidable protruding member does not retain the structure.

8. The accessory of claim 7 wherein the releasable retention means further comprises a resilient member connected to the slidable protruding member to bias the slidable protruding member to retain the structure.

9. The accessory of claim 7 further comprising a first attachment feature and a second attachment feature, wherein the first and second attachment features are attached to the accessory such that the first attachment feature is substantially parallel to the second attachment feature.

10. The accessory of claim 7 further comprising at least one bumper to engage the structure.

11. The accessory of claim 7 further comprising at least one hook to engage the structure.

12. The accessory of claim 7 wherein the opening is an elongated opening to substantially constrain rotation of the accessory about an axis perpendicular to the structure.

13. The accessory of claim 7 wherein the attachment feature further comprises at least one mounting structure and the attachment feature is attached to the accessory by the at least one mounting structure.

14. The accessory of claim 7 wherein the attachment feature is attached to the accessory by being a molded feature of the accessory.

15. An attachment member comprising:
    a housing with an enclosure;
    a slot in the housing with a wall opposite the enclosure;
    a retention member having a first end that retractably extends into the slot and a second end;
    a handle connected to the second end of the retention member; and
    a spring connected to the handle and retention member to bias the first end of the retention member into the slot;
    wherein when the first end of the retention member is in the slot, the first end does not extend beyond the wall of the slot; and
    wherein when the handle is not engaged, the first end of the retention member extends into the slot and the first end of the retention member is withdrawn into the enclosure and at least partially retracted from the slot by engagement of the handle.

16. The attachment mechanism of claim 15 wherein the first end of the retention member is a ramp.

17. The attachment mechanism of claim 15 further comprising a protective material attached to the slot.

18. The attachment mechanism of claim 1 wherein when the structure is received in the slot, the external force exerted on the release mechanism by the structure is less than the force exerted by the means for biasing and the means for biasing biases the retention member at least partially in the slot to hold the structure in the slot.

19. The attachment mechanism of claim 5 wherein when an external force is exerted on the handle that is greater than the force exerted by the means for biasing exerted on the retention member, the retention member is substantially removed from the slot.

\* \* \* \* \*